United States Patent [19]

Haytock, III

[11] 4,103,713

[45] Aug. 1, 1978

[54] REINFORCED OIL HOSE

[75] Inventor: Benjamin Haytock, III, Erie, Pa.

[73] Assignee: Continental Rubber Works, Erie, Pa.

[21] Appl. No.: 780,711

[22] Filed: Mar. 24, 1977

[51] Int. Cl.² .......................... F16L 11/08; F16L 11/12
[52] U.S. Cl. ..................................... 138/133; 138/109; 138/138
[58] Field of Search ............... 138/133, 127, 138, 109; 235/114

[56] References Cited

U.S. PATENT DOCUMENTS

| 945,686 | 1/1910 | Bonner | 138/127 |
|---|---|---|---|
| 2,854,030 | 9/1958 | Schulthess | 138/133 X |
| 3,109,461 | 11/1963 | Wolff et al. | 138/138 X |
| 3,154,329 | 10/1964 | Skinner | 138/138 X |
| 3,295,548 | 1/1967 | Woods | 285/114 X |
| 3,318,339 | 5/1967 | Stowell et al. | 138/138 |
| 3,933,554 | 1/1976 | Torghele | 138/138 X |
| 4,027,902 | 6/1977 | Tanikawa | 285/114 |

FOREIGN PATENT DOCUMENTS

| 792,388 | 12/1935 | France | 138/138 |
|---|---|---|---|
| 1,017,755 | 10/1957 | Fed. Rep. of Germany | 138/127 |

Primary Examiner—Richard E. Aegerter
Assistant Examiner—James E. Bryant, III
Attorney, Agent, or Firm—Charles L. Lovercheck

[57] ABSTRACT

A reinforced oil hose assembly intended for use in offshore tanker service incorporating a protective outer layer incorporating spiral wire, cable, links or other abrasion resistant material to resist abrasion and other abuses and incorporating a stress relief device at hose ends.

4 Claims, 4 Drawing Figures

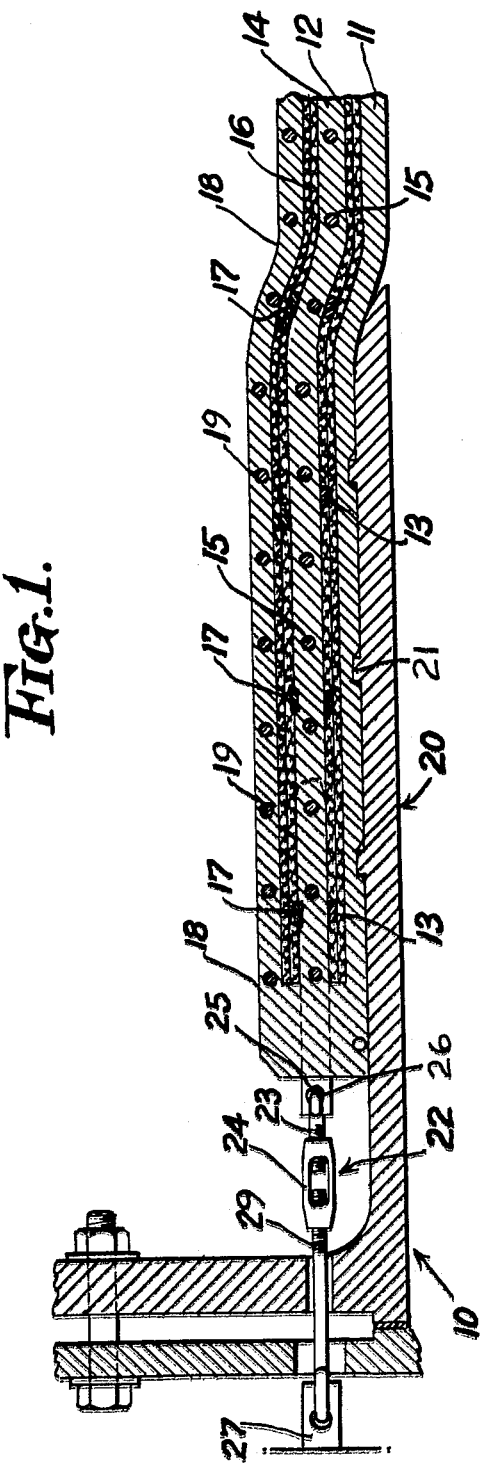
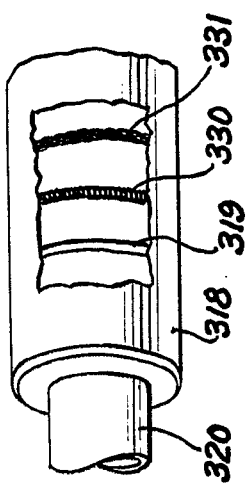
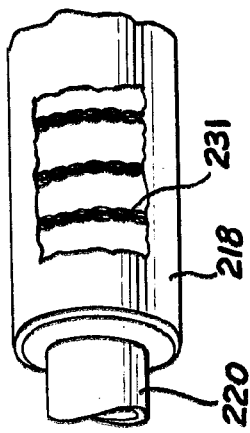
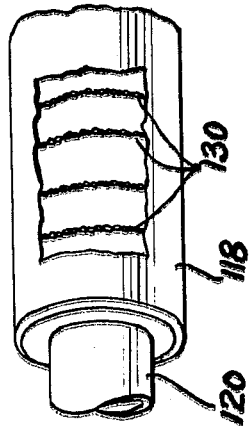

REINFORCED OIL HOSE

GENERAL DESCRIPTION OF THE INVENTION

Oil is generally transferred from the tankers to lighters and carried to the shore by them. The oil is transferred by means of suction hoses which are commonly 25 and 35 feet in length and may have an inside diameter of 8, 10 or 12 inches. The lighters carry the oil from the tanker to the shore since the tankers are frequently so large they cannot come in close.

The ships roll in heavy seas and damage the hoses externally and the braided and reinforced fiber fabric hoses, such as shown in U.S. Pat. No. 3,318,339, are damaged thereby. The present invention provides a protection device on the hose by putting a heavy steel spring wire embedded in the outer corrugated surface or a combination of heavy wire or links or cables or other shapes in combination or together. The spiral materials may be embedded or impotted in rubber material, neoprene, nylon, or other suitable plastic material that may be especially abrasion resistant and resistant to the stresses and strains that the hoses will be exposed to in use in connection with the ships referred to. It also provides a stress relief device to improve resistance to end stresses.

REFERENCE TO PRIOR ART

The present invention is an improvement over the reinforced hose structure, U.S. Pat. No. 3,318,339 issued to Charles Stowell and Benjamin Haytock III.

OBJECTS OF THE INVENTION

It is an object of the invention to provide an improved hose.

Another object of the invention is to provide an improved hose with an improved outer layer.

Another object of the invention is to provide an improved hose with greater resistance to end stresses.

Another object of the invention is to provide an improved hose that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a partial side view in cross section to show the various components of the reinforced hose according to the invention.

FIG. 2 is a view partly broken away of another embodiment of the invention showing links wound in the periphery.

FIG. 3 is a view similar to FIG. 2 showing another embodiment of the hose with steel cable in the periphery.

FIG. 4 is another embodiment of the invention showing a combination of spiral wire, links and cable.

DETAILED DESCRIPTION OF THE DRAWINGS

Now, with more particular reference to the drawings, the reinforced oil hose is shown generally at 10 in FIG. 1. The reinforced oil hose 10 has an inner tubular liner 11 which is made of an oil resistant and pliable material such as chloroprene rubber. The inner tubular liner 11 extends the length of the reinforced oil hose 10. The inner tubular liner 11 is adapted at its ends to engage the annular ridges 21 on a steel nipple 20 and may be made of a suitable material familiar to those skilled in the art. Lying around the inner tubular liner 11 and concentric thereto is the first layer of reinforcing material 12. This layer may consist of several plies. Two plies are shown and there may be more plies of a suitable reinforcing material. Spaced along the first layer of reinforcing material 12 are first steel retaining bands 13. The first steel retaining bands 13 extend around the layer 13 of reinforcing material and are congruent therewith. Overlying the first layer of reinforcing material 12 and the first steel retaining bands 13 is a layer of resilient material 14 which overlies the lower layers and is concentric thereto. The layer of resilient material 14 contains a first spiral wire 15 which is disposed concentric to said layer of resilient material 14. Overlying the layer of resilient material is the second layer of reinforcing material 16 which may consist of one or more plies of a suitable reinforcing material. This second layer of reinforcing material 16 has second steel retaining bands 17 spaced along the length of the hose 10 and lying concentric to the inner surface of the second layer of reinforcing material 16. Overlying the second layer of reinforcing material 16 is a layer of abrasive resistant material 18 which is made up of a suitable abrasive resistant material which may be a high grade neoprene or other rubber or rubber-like material. The layer of abrasive resistant material 18 has embedded in it the second spiral wire 19 which is disposed near the outer surface of the abrasive resistant material 18 and disposed concentric to said layer of resistant material.

The ends of the reinforced oil hose 10 are provided with stress relief devices 22 which have one or more bars 25 which protrude from the ends of the hose from the layer of resilient material 14. The bars 25 are attached to a tie rod 23 which is provided with a turn buckle 24 or other locking device. Threaded rod 23 has a hook 26 that is received in a hole in bar 25. Threaded bar 29 has a hook or other locking device that is received in a hole in anchor 27 in the oil barge or that is received by the stress relief device in another section of hose. The tie rod is suitably attached to reduce the danger of nipple retention failure under extreme tensile stresses on the end of the hose.

In the embodiment of the invention shown in FIG. 2, a nipple 120 is shown similar to the nipple 20 in the embodiment of FIG. 1. The hose having the outer abrasion resistant layer 118 has spiral links 130 embedded therein.

In the embodiment of the invention shown in FIG. 3, a nipple 220 is shown similar to the nipple 20 in the embodiment of FIG. 1, engaged to the hose having outer abrasion resistant layer 218 with spiral cables 231 embedded therein.

In the embodiment of the invention shown in FIG. 4, the nipple 320 has the abrasion resistant material 318 on the outside having the spiral wires 319, the spiral links 330 and the spiral cables 331 embedded therein.

The assembly of the reinforced oil hose protects the internal components from damage caused by abrasion and other abuses encountered in frequent usage by means of the external protective devices outlined herein.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A reinforced oil hose assembly comprising, a tubular inner liner of oil-resistant material, a tubular first ply of reinforcing material made of fabric overlying said inner lining and resting thereon, a plurality of first metal rings overlying said first ply of reinforcing material, said first metal rings being spaced along the length of said first ply of reinforcing material and engaging the outside periphery thereof, a first layer of resilient tubular material overlying said first ply of reinforcing material and said first metal rings, a first spiral wire embedded in the layer of resilient material and disposed concentric to said inner liner and embedded in said first ply of resilient material, a second layer of tubular reinforcing material overlying said first ply of resilient material and resting thereon, a plurality of second metal retaining bands spaced along the length of the said reinforced oil hose and concentric to said second ply of reinforcing material and disposed between said second ply of reinforcing material, a layer of abrasive resistant material overlying said second ply of reinforcing material and said second retaining bands and a spiral material wound around said tubular member embedded in said abrasive material.

2. The reinforced oil hose assembly recited in claim 1 wherein axially extending bar means are embedded in the first layer of resilient material adjacent the first spiral wire at the end of the hose and protruding from an end of said hose, said bar means being adapted to attach it to a suitable retaining device.

3. The hose recited in claim 1 wherein said spiral material is in the form of chain links.

4. The hose recited in claim 1 wherein said spiral material is cable.